(12) United States Patent
Gaudron

(10) Patent No.: US 7,735,572 B2
(45) Date of Patent: Jun. 15, 2010

(54) CARRIER STRIP SYSTEM AND METHOD FOR DIFFERENT DIAMETER FASTENERS

(75) Inventor: Paul Gaudron, Stamford, CT (US)

(73) Assignee: Power Products III, LLC, New Rochelle, NY (US)

( * ) Notice: Subject to any disclaimer, the term of this patent is extended or adjusted under 35 U.S.C. 154(b) by 0 days.

(21) Appl. No.: 12/261,834

(22) Filed: Oct. 30, 2008

(65) Prior Publication Data

US 2009/0053032 A1 Feb. 26, 2009

Related U.S. Application Data

(60) Division of application No. 11/766,380, filed on Jun. 21, 2007, which is a continuation-in-part of application No. 11/230,890, filed on Sep. 20, 2005, now abandoned.

(51) Int. Cl.
*B25C 3/00* (2006.01)
*F16B 27/00* (2006.01)

(52) U.S. Cl. .......................................... 171/1; 173/171

(58) Field of Classification Search .................. 173/1, 173/171; 227/109, 120, 136
See application file for complete search history.

(56) References Cited

U.S. PATENT DOCUMENTS

| | | | |
|---|---|---|---|
| 3,915,367 A | 10/1975 | Potucek | |
| 4,072,261 A | 2/1978 | Livio | |
| 4,313,552 A | 2/1982 | Maurer | |
| 4,383,608 A | 5/1983 | Potucek | |
| 4,558,811 A | 12/1985 | Klaus | |
| 4,581,964 A | 4/1986 | Takatsuru | |
| 4,606,455 A | 8/1986 | Grikis et al. | |
| 4,718,551 A | 1/1988 | Whitledge | |
| 4,815,647 A | 3/1989 | Chou | |
| 5,240,161 A * | 8/1993 | Kaneko | 227/109 |
| 5,556,020 A * | 9/1996 | Hou | 227/109 |
| 5,615,819 A * | 4/1997 | Hou et al. | 227/109 |
| 5,653,371 A * | 8/1997 | Hou | 227/109 |
| 5,775,514 A | 7/1998 | Lin | |
| 5,931,622 A | 8/1999 | Gupta | |
| 6,641,021 B2 * | 11/2003 | Jablonski | 227/120 |
| 6,679,415 B1 | 1/2004 | Gupta | |

FOREIGN PATENT DOCUMENTS

| | | |
|---|---|---|
| WO | 2004/061314 | 7/2004 |
| WO | 2005/028160 | 3/2005 |

OTHER PUBLICATIONS

International Search Report with Written Opinion, PCT/US2008/066405, Date Mailed Dec. 10, 2008. Written Opinion having 8 pages, International Search Report having 4 pages.
International Search Report PCT/US2006/033501 Mailed Dec. 5, 2006; International Search Report 6 pages and Written Opinion 5 pages.

* cited by examiner

*Primary Examiner*—Brian D Nash
(74) *Attorney, Agent, or Firm*—Cantor Colburn LLP

(57) ABSTRACT

A carrier strip system includes a plurality of discrete carrier strips respectively receptive of fasteners of substantially different dimensions the strips having internal features configured to engage the fasteners, the strips further having substantially identical external dimensions said external dimensions being substantially symmetrical with respect to a virtual surface defined by inclusion of axes of the plurality of discrete fasteners, and the external dimensions being engagable with a single setting tool magazine such that fasteners with different dimensions have consistent alignment within a single setting tool magazine and method.

2 Claims, 5 Drawing Sheets

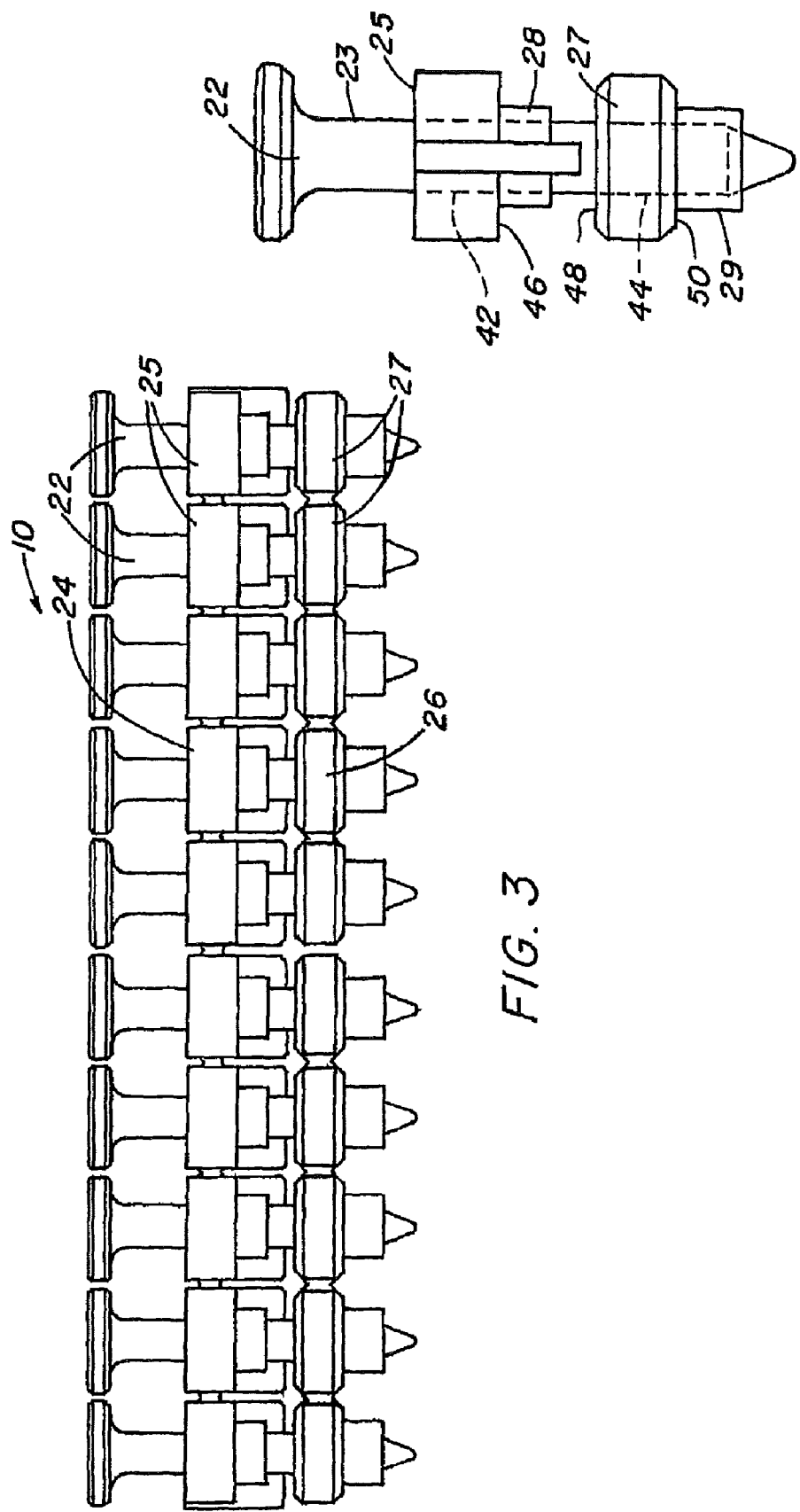

CARRIER STRIP SYSTEM AND METHOD FOR DIFFERENT DIAMETER FASTENERS

CROSS-REFERENCE TO RELATED APPLICATION

This is a divisional application of U.S. patent application Ser. No. 11/766,380 filed Jun. 21, 2007, the entire disclosure of which is incorporated herein by reference.

CROSS REFERENCE TO RELATED APPLICATION

This application is a continuation in part application of U.S. Ser. No. 11/230,890, filed Sep. 20, 2005, the contents of which are incorporated by reference herein in their entirety.

BACKGROUND

Fastener setting tools have become common tools in the construction industry. Their ability to drive a fastener fully with just the pull of a trigger is significantly more efficient than methods of hammering or screwing fasteners in. Traditionally, setting tools required their fasteners be loaded one at a time into the proper position in the setting tool before they could be driven into the work piece. More recently, setting tools have included a magazine that spring loads several fasteners, for auto loading, which significantly increases the speed at which large numbers of fasteners can be driven. Such magazines are augmented with respect to function by the advent of fastener holders in the form of carrier strips.

A wide variety of fasteners are now available for use with setting tools. This variety is required to meet the particular demands of the work pieces being joined together. One common variation in fasteners is their diameter. Different diameter fasteners are employed in distinct magazines or distinct setting tools. Distinct magazines at best are required in order to ensure proper feed of the fasteners. Such arrangements require a user employing fasteners of different diameters to have multiple magazines or multiple setting tools, and further may require additional time when magazines are replaced to accommodate different diameter fasteners. This leads to inefficiency and is therefore undesirable.

SUMMARY

A carrier strip system includes a plurality of discrete carrier strips respectively receptive of fasteners of substantially different dimensions the strips having internal features configured to engage the fasteners, the strips further having substantially identical external dimensions said external dimensions being substantially symmetrical with respect to a virtual surface defined by inclusion of axes of the plurality of discrete fasteners, and the external dimensions being engagable with a single setting tool magazine such that fasteners with different dimensions have consistent alignment within a single setting tool magazine.

A method of presenting substantially differently dimensioned fasteners to a single setting tool through a single setting tool magazine includes sizing internal dimensions of a plurality of discrete carrier strips to engage substantially different dimensions of discrete fasteners; loading the discrete fasteners into the plurality of discrete carrier strips; and maintaining external dimensions of the plurality of discrete carrier strips such that the plurality of discrete carrier strips are engagable in a single setting tool magazine by at least the external dimensions to consistently align the discrete fasteners relative to a single setting tool magazine.

BRIEF DESCRIPTION OF THE DRAWINGS

Referring to the drawings wherein like elements are numbered alike in the several Figures:

FIG. 3 is a front elevation view of a small diameter carrier strip assembly of an embodiment of the invention;

FIG. 4 is a side elevation view of the carrier strip assembly of FIG. 3;

DETAILED DESCRIPTION

In connection with the above-identified drawbacks of the prior art, the presently disclosed concept allows for fasteners of different diameters to be run in the same magazine of a setting tool. In order for such an application to be possible, an outside diameter of a fastener carrier strip must remain the same for different fastener diameters and yet securely hold the fastener in place. Moreover, since setting tool magazines employ a diametric surface of the fastener as an additional guiding surface, where narrower diameter fasteners are to be utilized in the same setting tool magazine accommodation must be made for the guiding function of the outside diameter of the larger diameter fasteners when using the smaller diameter fasteners.

Figure 1:
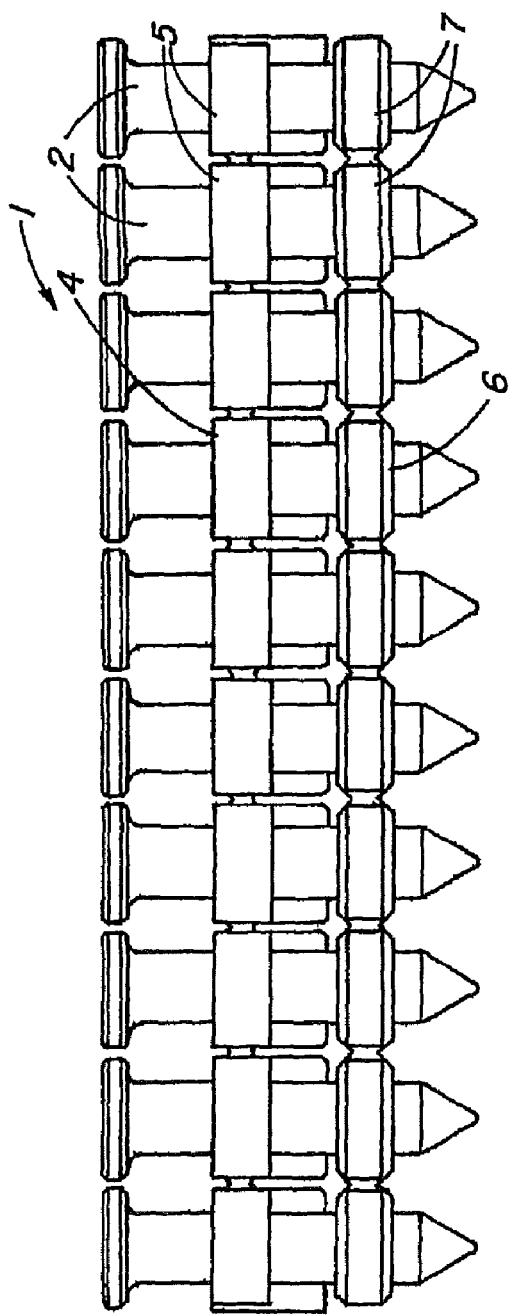
FIG. 1 is a front elevation view of a large diameter carrier strip assembly of an embodiment of the invention.

Referring to FIG. 1, a large diameter carrier strip assembly 1 is illustrated comprising: large diameter fastener(s) 2, a large diameter head-end break-free strip 4 made of several head-end segments 5, and a large diameter point-end break-free strip 6 made of several point-end segments 7. The carrier strip assembly 1 is illustrated in a condition in which it may be loaded into a fastener setting tool such as a combustion driven fastening system.

Figure 2:
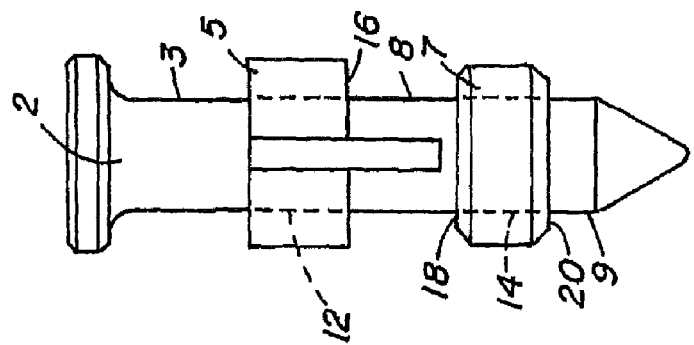
FIG. 2 is a side elevation view of the carrier strip assembly of FIG. 1.

Referring to FIG. 2, each head-end segment 5 has a hole 12 therethrough and each point-end segment 7 has a hole 14 therethrough. The segment 5 to segment 5 spacing in the head-end break-free strip 4 is equal to the segment 7 to segment 7 spacing of the point-end break-free strip 6, causing the hole 12 to hole 12 spacing to be the same as the hole 14 to hole 14 spacing. Holes 12 and 14 are sized to create an interference fit with the outside diameter 3 of the large diameter fastener 2. The interference fit maintains the relative position of the large diameter head-end break-free strip 4, the large diameter point-end break-free strip 6 and the large diameter fastener(s) 2 to each other.

As alluded to above there are several registers for the strip in a magazine (not shown), these are both diametrical and axial. These registers contact surfaces on the components that make up the large diameter carrier strip assembly 1 to assure the large diameter carrier strip assembly 1 will be properly guided and indexed within the magazine and setting tool (not shown). Diameters 8 and 9 are registered in the magazine to assure proper alignment of the fastener 2 prior to discharge from the fastener setting tool. Diameter 8 is immediately beyond radial surface 16 of head-end segment 5 in the direction of the point-end of the fastener 2, and diameter 9, is immediately beyond radial surface 20 of point-end segment 7 in the direction of the point-end of the fastener 2. Radial surfaces 18 and 20 are also registered in the magazine to properly locate the fastener 2 in an axial direction prior to its discharge from the fastener setting tool. Radial surface 18 is formed on the head-end of segment 7 and radial surface 20 is formed on the point-end of segment 7. Since surface 18 and surface 20 are formed on the same component, segment 7, the distance between them can be accurately controlled.

As is easily observable in FIG. 2 the segments 5 and 7 are symmetrical about a virtual surface defined by inclusion of axes of the fasteners 2 and the segments 5 and 7 that make up the strip 1. Such symmetry allows the fastener setting tool to contact the segments 5, 7 from either or both sides of the virtual surface and thereby accurately align the fasteners 2 relative to the fastener setting tool. The symmetry of the strip 1 also allows the strip 1 to be installed into the magazine of the fastener setting tool in one of two orientations, resulting in easier and faster loading of strips 1 into the magazine since orienting the strip 1 into one of two orientations relative to the magazine is not necessary.

Referring to FIG. 3, a small diameter carrier strip assembly 10 is illustrated comprising: small diameter fastener(s) 22, a small diameter head-end break-free strip 24 made of several head-end segments 25, and a small diameter point-end break-free strip 26 made of several point-end segments 27. The carrier strip assembly 10 is illustrated in a condition in which it may be loaded into a fastener setting tool such as a combustion driven fastening setting tool, for example.

Referring to FIG. 4, each head-end segment 25 has a hole 42 therethrough and each point-end segment 27 has a hole 44 therethrough. The segment 25 to segment 25 spacing in the head-end break-free strip 24 is equal to the segment 27 to segment 27 spacing of the point-end break-free strip 26, causing the hole 42 to hole 42 spacing to be the same as the hole 44 to hole 44 spacing which also matches the hole 12 to hole 12 spacing of the large diameter head-end break-free strip 4. Holes 42 and 44 are sized to create an interference fit with the outside diameter 23 of the small diameter fastener 22. The interference fit maintains the relative position of the small diameter head-end break-free strip 24, the small diameter point-end break-free strip 26 and the small diameter fastener(s) 22 to each other.

As described earlier, there are several registers for guiding the large diameter carrier strip assembly 1 within the magazine of the fastener setting tool. The surfaces on the components of the small diameter carrier strip assembly 10 that interface with the registers in the magazine must therefore match those from the large diameter carrier strip assembly 1 in order for the small diameter carrier strip assembly 10 to feed properly into the magazine of the fastener setting tool.

Segments 27, therefore, which make up the small diameter point-end carrier strip 26, have surfaces to match those of the segments 7 of the large diameter point-end carrier strip 6. Specifically, the radial surfaces 48 and the radial surfaces 50 will register within the magazine just as the radial surfaces 18 and radial surfaces 20 did for the large diameter head-end segments 5. Further, the axial distance separating radial surfaces 48 from radial surfaces 50 of segments 27 match the axial distance separating radial surfaces 18 from radial surfaces 20 of segments 7. Thereby, allowing either the large diameter fastener carrier strip 1 or the small diameter fastener carrier strip 10 to axially register within a single magazine.

Similarly, the diametrically registering surfaces match as well. Specifically, diameters 28 of segments 25 positioned immediately beyond radial surfaces 46 match the diameters 8 of the large diameter fasteners shank. The fact that diameters 28 are formed as part of the segments 25 whereas diameters 8 are formed as part of the fasteners 2 do not effect the registration within the magazine as long as the diameters are substantially equal.

The other diametrically registering surfaces from the large diameter carrier strip 1 are diameters 9 of the large diameter fasteners shank. Therefore, diameters 29 of segments 27 match that of diameters 9 of large diameter fasteners 2.

Figure 5:
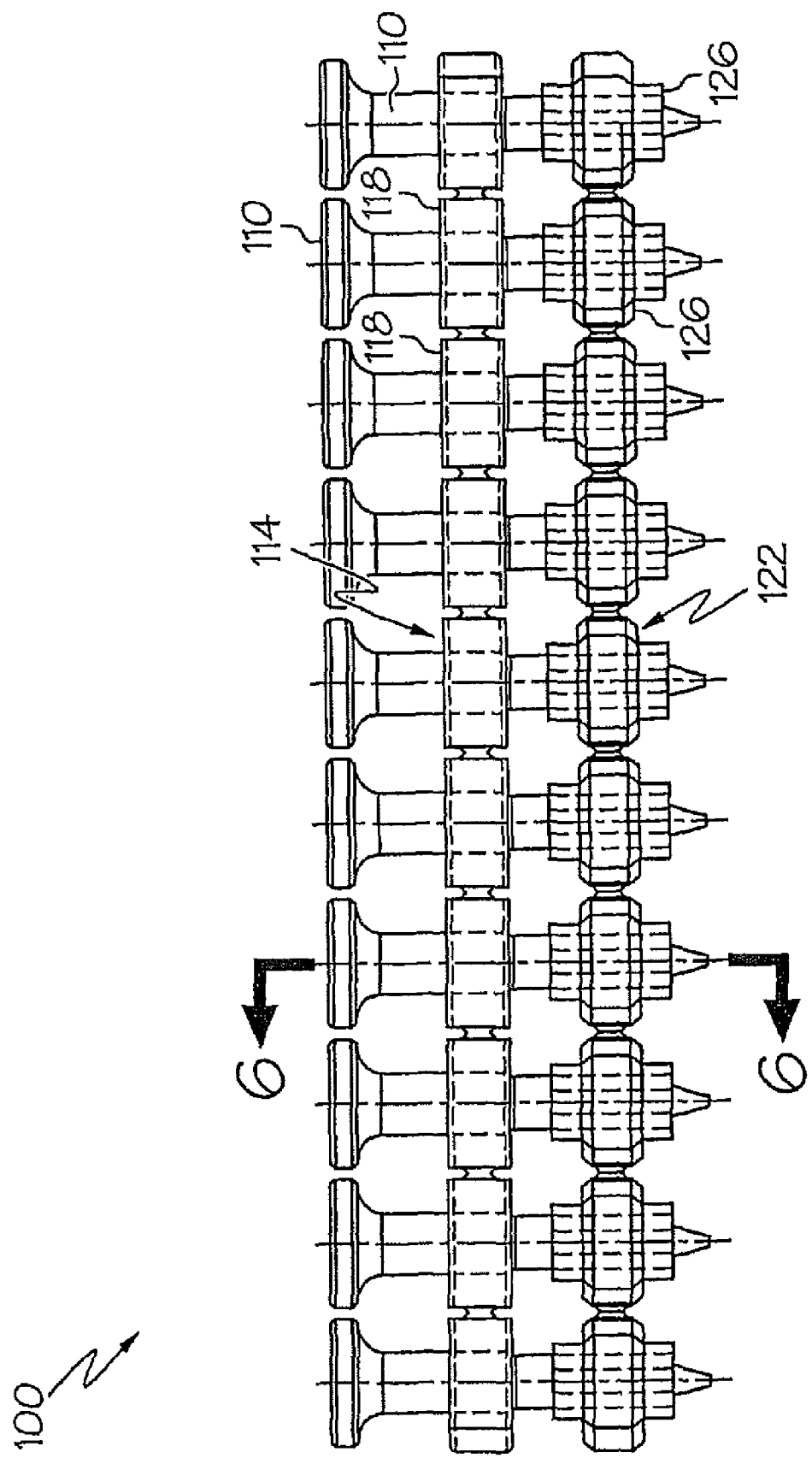
FIG. 5 is a front elevation view of a varied diameter carrier strip assembly of an embodiment of the invention.

Referring to FIG. 5, a varied diameter carrier strip assembly 100 is illustrated. The strip assembly 100 includes, a plurality of varied diameter fasteners 110, a varied diameter head-end break-free strip 114 made of several head-end segments 118, and a varied diameter point-end break-free strip 122 made of several point-end segments 126. The carrier strip assembly 100 is illustrated in a condition in which it may be loaded into a fastener setting tool such as a combustion driven fastening setting tool, for example.

Figure 6:
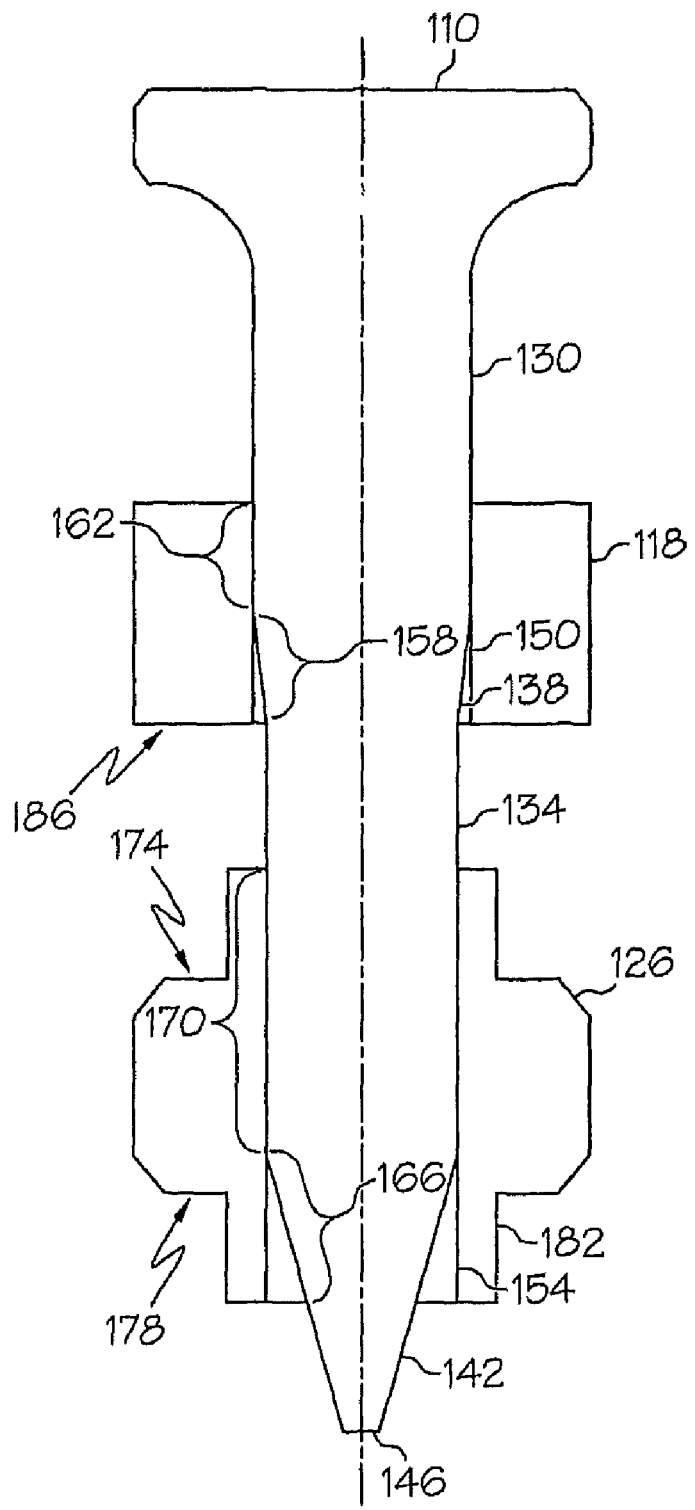
FIG. 6 is a side cross sectional view of the carrier strip assembly of FIG. 5 taken at arrows 6-6.

Referring to FIG. 6, a cross sectional view of the varied diameter carrier strip assembly 100 is illustrated. One of the one of the varied diameter fasteners 110 is shown as having a first diameter portion 130 and a second diameter portion 134 with the first diameter portion 130 being a larger diameter than the second diameter portion 134. A first varied diameter portion 138 transitions the first diameter portion 130 to the second diameter portion 134. The first varied diameter portion 138 of this embodiment has a frustoconical shape, however, other transitional shapes could be employed between the first diameter portion 130 and the second diameter portion 134. Similarly, a second varied diameter portion 142 transitions the second diameter portion 134 to a point 146 of the fastener 110 with a frustoconical shape. The point 146 of this embodiment has a flat surface truncating the second varied diameter portion 142, however, other embodiments could have other point geometries such as a small spherical radius at the apex, for example.

Each head-end segment 118 has a hole 150 therethrough and each point-end segment 126 has a hole 154 therethrough. The segment 118 to segment 118 spacing in the head-end break-free strip 114 is equal to the segment 126 to segment 126 spacing of the point-end break-free strip 122, causing the hole 150 to hole 150 spacing to be the same as the hole 154 to hole 154 spacing which also matches the hole 12 to hole 12 spacing of the large diameter head-end break-free strip 4. Holes 150 and 154 are sized to create an interference fit with the first diameter portion 130 and the second diameter portion 134 respectively. Friction generated by the interference fit maintains the relative position of the varied diameter head-end break-free strip 114, the varied diameter point-end break-free strip 122 and the varied diameter fastener(s) 110 to each other. The fact that a portion 158 of the first varied diameter portion 138 is positioned axially within the hole 150 is acceptable since a portion 162 of the first diameter portion 130 is also positioned axially within the hole 150. As such, the interference fit of the portion 162 of the first diameter portion 130 with the hole 150 provides the friction required to maintain the relative position of the varied diameter head-end break-free strip 114 to the fasteners 110. Similarly, the fact that a portion 162 of the second varied diameter portion 142 is positioned axially within the hole 154 is acceptable since a portion 166 of the of the second diameter portion 134 is also positioned axially within the hole 154. As such, the interference fit of the portion 170 of the second diameter portion 134 with the hole 154 provides the friction required to maintain the relative position of the varied diameter point-end break-free strip 122 to the fasteners 110.

The varied diameter carrier strip assembly 100 has several registers for guiding the strip assembly 100 within the magazine of the fastener setting tool. These registers of the strip assembly 100 interface with the registers in the magazine and also match registers from the large diameter carrier strip assembly 1 in order for the strip assembly 100 to feed properly into the magazine of the fastener setting tool. Specifically, segments 126 have surfaces that match those of the segments 7 of the large diameter point-end carrier strip 6. For example, radial surfaces 174 and 178 register within the magazine just as the radial surfaces 18 and 20 for the large diameter head-end segments 5 do. Further, the axial distance separating the radial surfaces 174 from radial surfaces 178 of segments 126 match the axial distance separating radial surfaces 18 from radial surfaces 20 of segments 7, thereby allowing either the large diameter fastener carrier strip 1 or the varied diameter fastener carrier strip 100 to axially register within a single magazine.

Similarly, the diametrically registering surfaces match as well. Specifically, diameters 134 immediately below (in the Figures) radial surfaces 186 of the segments 118 match the diameters 8 additionally diameters 182 immediately below the radial surfaces 178 match the diameters 9. In this embodiment the diameters 134 are a portion of the fastener 110, while in alternate embodiments the diameter 134 could be on a portion of the segments 118, for example. By having registering diameters, for example, such as the diameters 134 immediately below the radial surface 186 and diameters 182 immediately below radial surface 178 that are consistent between various embodiments of the strip assemblies 1, 10 and 100 the fit to the same fastener setting tool magazine and subsequently to the fastener setting tool will be assured.

Figure 7:
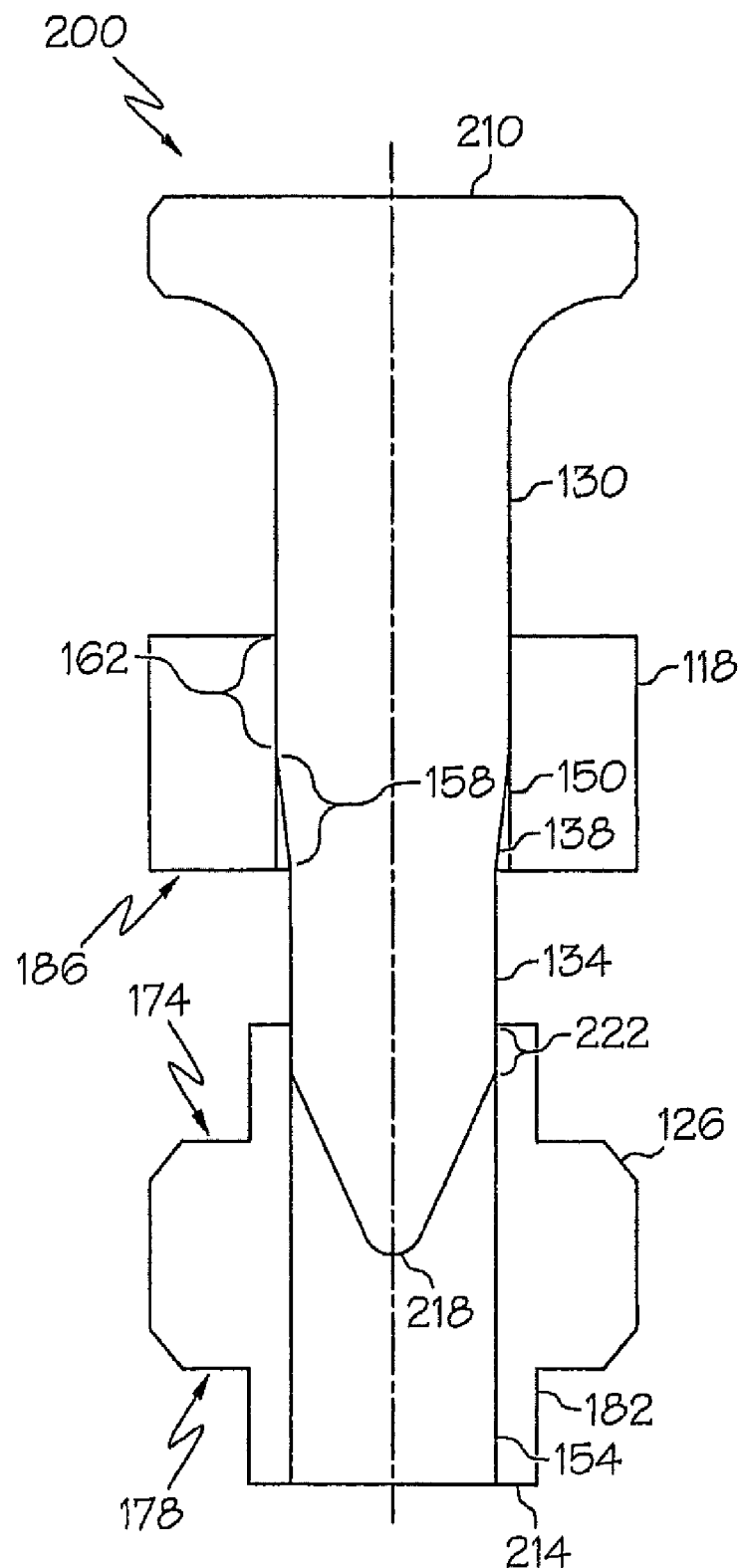
FIG. 7 is a side cross sectional view of an alternate carrier strip with short fasteners.

Referring to FIG. 7, a cross sectional view of a varied diameter carrier strip assembly 200 is illustrated. The strip assembly 200 is similar to the strip assembly 100 in that the head-end segments 118 and the point-end segments 126 that are uses in strip assembly 100 are also used in strip assembly 200. By using the same segments 118, 126 the strip assembly 200 is sure to fit and function within the same setting tools and magazines that the strip assembly 100 does. The difference between the strip assembly 200 and the strip assembly 100 is that the strip assembly 200 uses varied diameter fasteners 210 that are shorter than the varied diameter fasteners 110 that are used in the strip assembly 100. In fact, the fasteners 210 are so short, they do not extend beyond a radial surface 214 that is the furthest portion of the strip assembly 200 in a direction of a point 218 of the fastener 210. The only limitation on the length of the fastener 210 is that the second diameter portion 134 has a portion 222 that extends within the diameter 154 long enough to provide a frictional engagement between the fastener 210 and the point-end strip 126 to positionally locate them relative to one another. Thus, one embodiment of the present invention, disclosed in FIG. 7, permits usage of fasteners in a magazine and a setting tool receptive of the magazine that are dimensionally smaller (in at least one direction) than the guide strips 118, 126 through which they are mounted and fixtured.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of aligning substantially differently dimensioned fasteners to a single setting tool through a single setting tool magazine, comprising:

sizing internal dimensions of a plurality of discrete carrier strips to engage substantially different dimensions of discrete fasteners;

loading said discrete fasteners into said plurality of discrete carrier strips;

maintaining external dimensions of said plurality of discrete carrier strips such that said plurality of discrete carrier strips are engagable in a single setting tool magazine by at least the external dimensions to consistently align respective axes of said discrete fasteners relative to a single setting tool magazine; and maintaining the external dimensions of said plurality of discrete carrier strips laterally symmetrical about axes of the plurality of discrete fasteners relative to a longitudinal axis of the carrier strip that extends through the plurality of discrete fasteners.

2. The method of claim 1, further said discrete carrier strips are loadable into a single setting tool magazine in one of two orientations.

* * * * *